United States Patent [19]
Roca et al.

[11] Patent Number: 5,086,022
[45] Date of Patent: Feb. 4, 1992

[54] REACTION MEDIUM IMPROVING THE CHARACTERISTICS OF ABSORPTION AND OF DESORPTION OF A GAS

[75] Inventors: Alain Roca, Perpignan; Sylvain Mauran, Rivesaltes; Bernard Spinner, Elne, all of France

[73] Assignee: Societe Nationale Elf Aquitaine, Paris, France

[21] Appl. No.: 423,440

[22] PCT Filed: Jan. 26, 1989

[86] PCT No.: PCT/FR89/00024
§ 371 Date: Oct. 30, 1989
§ 102(e) Date: Oct. 30, 1989

[87] PCT Pub. No.: WO89/07009
PCT Pub. Date: Aug. 10, 1989

[30] Foreign Application Priority Data
Jan. 29, 1988 [FR] France .................... 88 01029

[51] Int. Cl.⁵ .................. B01J 20/18; B01J 20/20; B01J 20/04; C09K 5/00
[52] U.S. Cl. .................. 502/60; 62/324.1; 165/104.12; 237/2 B; 252/69; 502/64; 502/80; 502/410; 502/411; 502/413; 502/417

[58] Field of Search .................. 502/64, 80, 401, 411, 502/413, 417, 60; 252/69, 70, 378 R, 378 P; 165/104.12; 62/324.1-324.6; 237/2 B

[56] References Cited

U.S. PATENT DOCUMENTS

| | | | |
|---|---|---|---|
| 2,986,525 | 5/1961 | Hughes | 252/69 |
| 4,595,774 | 6/1986 | Coste et al. | 556/118 |
| 4,660,629 | 4/1987 | Maier-Larhvber et al. | 165/104.12 |
| 4,754,805 | 7/1988 | Rothmayer | 165/104.12 |
| 4,906,258 | 3/1990 | Balat et al. | 55/74 |

FOREIGN PATENT DOCUMENTS

2547512 12/1984 France.

*Primary Examiner*—Paul E. Konopka
*Attorney, Agent, or Firm*—Bacon & Thomas

[57] ABSTRACT

Process for improving the characteristics of absorption and desorption of a gas by a reaction medium consisting of several salts in powder form and a porous solid product, characterized in that it consists in mixing 0 to 60% by mass of the porous product with the powdered salt(s). The porous product consists of a mixture of expanded graphite and a second expanded product of rigid structure and high permeability.

15 Claims, 2 Drawing Sheets

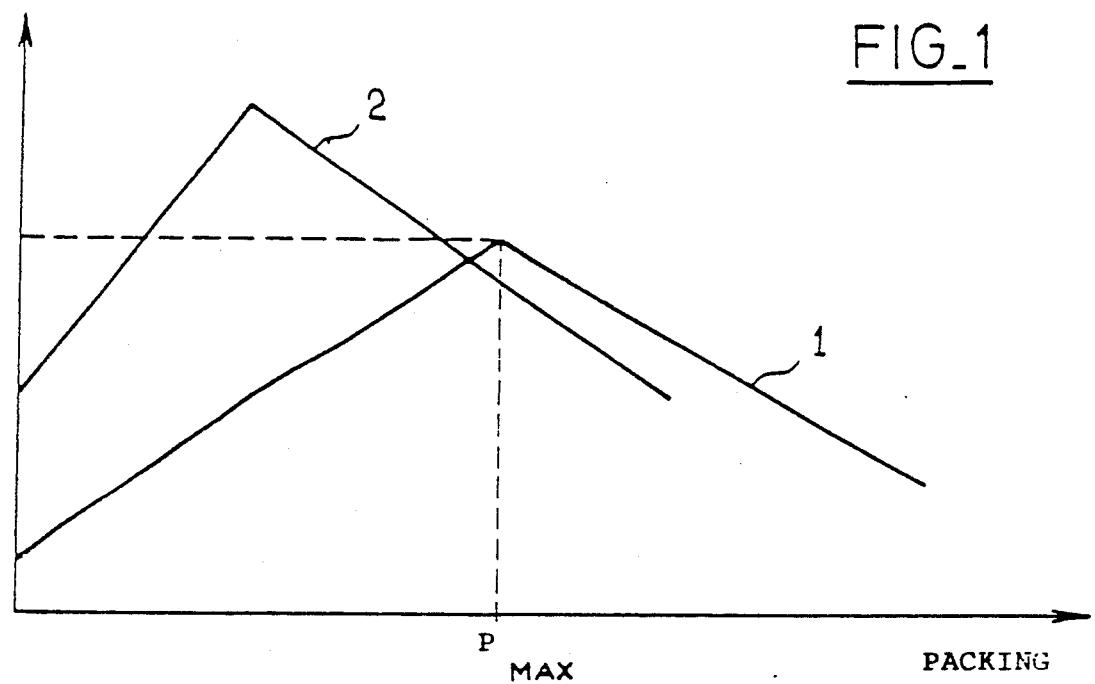
FIG_1
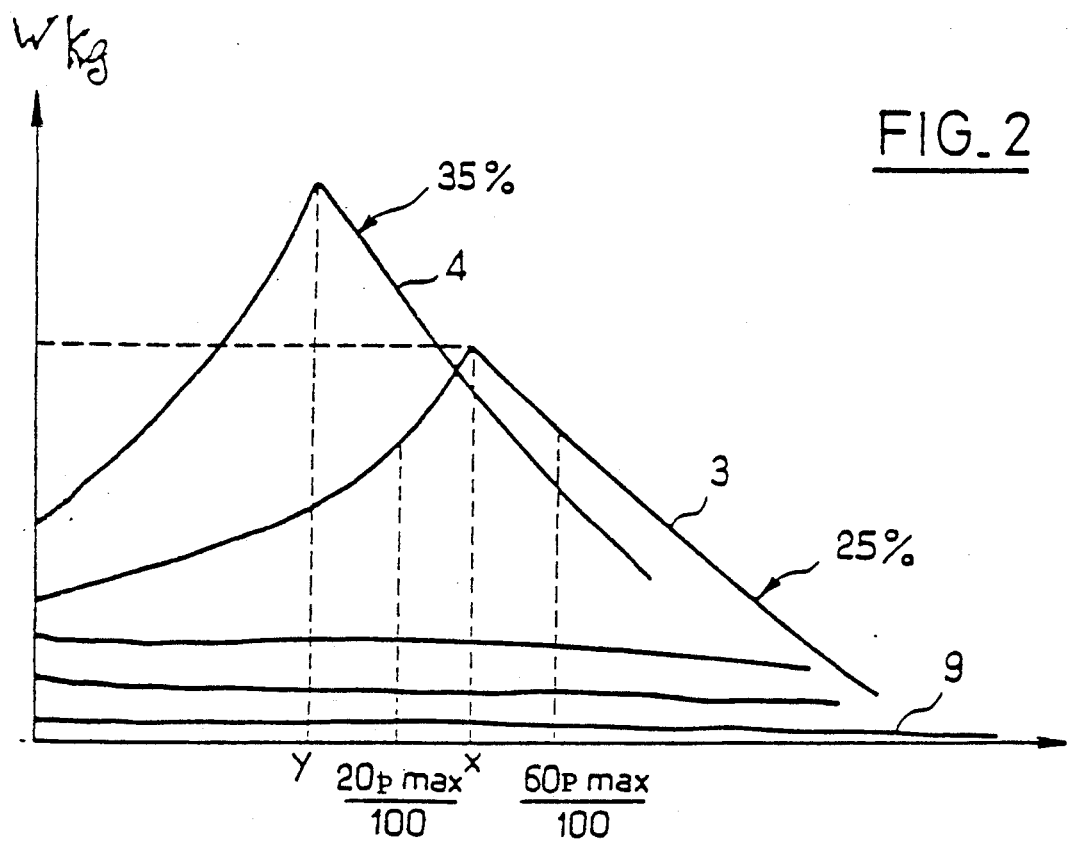
FIG_2

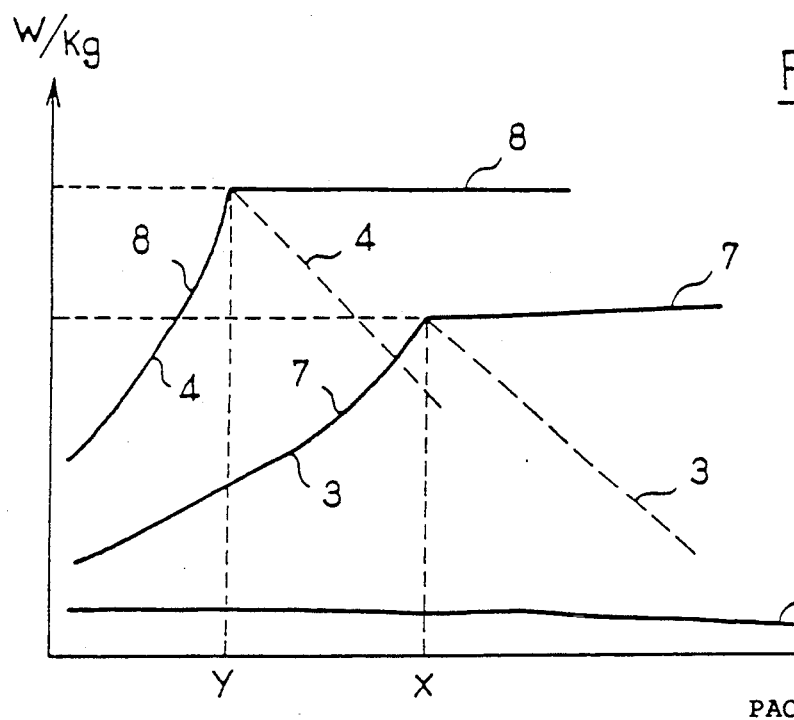
FIG_3
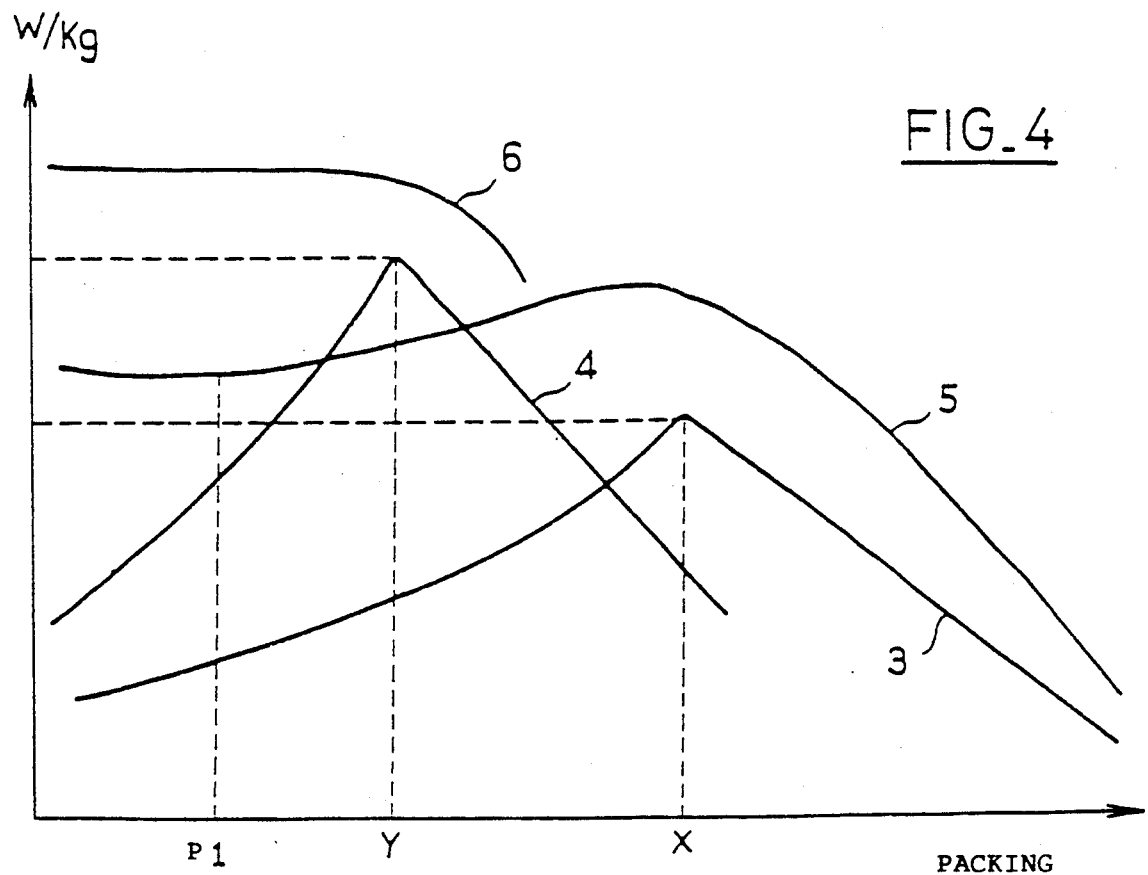
FIG_4

REACTION MEDIUM IMPROVING THE CHARACTERISTICS OF ABSORPTION AND OF DESORPTION OF A GAS

The present invention relates to a process for improving the characteristics of absorption and of desorption of a gas by a reaction medium and to the reaction medium thus obtained for applications to chemical heat pumps.

Patent Application 87/12,389, filed in the name of the Elf Aquitaine company on 7 Sept. 1987 discloses a process for constituting a reaction medium for conducting an absorption and desorption reaction in a chemical heat pump. This process teaches the packing percentages of a salt relative to the optimum packing of the salt as a function of the mass percentage of the reaction product of a porous product, which makes it possible to obtain an optimization of the energy densities of the reaction medium. Thus, a maximum packing (Tmax, FIG. 1) enables a maximum energy density to be obtained as a function of a given salt (1). This value is called the optimum packing of the reaction without graphite and expresses the maximum energy which can be introduced into a chemical storage system employing a salt and a gas. A maximum energy density and a maximum packing correspond to a first salt, shown by curve (1) in FIG. 1, and other values of packing and of energy density correspond to a second salt, represented by curve (2). In the above application an investigation was made, in the case of reaction media consisting of expanded graphite and of one or more salts, of the percentages (X, Y, FIG. 2) of optimum packing which, as a function of the percentage of expanded graphite, made it possible to obtain a reaction medium whose operating region was situated in the energy densities and powers which were advantageous for heat storage and release applications. Thus, as can be seen in FIG. 2, in the case of a reaction medium represented by curve (3), consisting of a mixture of salt with 25 mass % of expanded graphite, a maximum specific power is obtained for a given percentage X of optimum packing. As expressed in the above patent application, it is found that one remains in the specific power regions which are high and capable of being employed for heat storage and release reactions, in the case of a packing value expressed as the number of kilograms of mixture per m³ of between 20% and 60% of the optimum packing of the reaction without graphite. Similarly, in the case of a reaction medium represented by curve (4), containing 35 mass % of expanded graphite, it has been possible to establish that the salt packing had to be chosen between 15 and 50% of the optimum packing. We shall recall, furthermore, that expanded graphite is employed as a good heat conductor and for its porosity, which makes it easier for the reaction gas to pass through the reaction medium during the absorption or desorption reaction. This is important, because the metal or alkaline-earth metal halides employed as salt are poor conductors. Furthermore, these salts begin to swell when they react with a gas such as, for example, ammonia or methylamine, which react with calcium chloride.

However, as can be seen from the curves in FIG. 2, the power depends enormously on the packing and varies very rapidly as a function of the latter. This phenomenon, related to the salt swelling phenomenon, which can give rise to a blockage of the reaction medium in the thermochemical reactor, is a major disadvantage.

An object of the invention is to propose a process for improving the characteristics of absorption or of desorption of a gas by a reaction medium, to make them relatively independent of the packing of the reaction medium.

This object is attained by the fact that the process for improving the characteristics of absorption and of desorption of a gas by a reaction medium consisting of one or more salts in a pulverulent form and of a porous solid product, consists in mixing between 0 and 60 mass % of the porous product with the pulverulent salt(s), the porous product consisting of a mixture of expanded graphite and of a second expanded product of rigid structure and high permeability.

According to another characteristic, the second expanded product is obtained from an exfoliated hydrated lamellar mineral.

According to an advantageous characteristic, the second expanded product is vermiculite.

According to another characteristic, the second product is perlite.

According to a preferred embodiment, in the case of a mass percentage of porous product equal to 25% of the reaction medium, the latter comprises 20% of expanded graphite and 5% of the second product.

According to another preferred embodiment, in the case of a mass percentage of the porous product equal to 35% of the reaction medium, the porous product comprises 25% of expanded graphite and 10% of the second product.

According to another embodiment, the packing of the salt(s) is higher than 60% of the optimum packing.

Another object of the invention is to provide a process of improvement which is also valid in the case of relatively low packing values.

This object is attained by the fact that in the process the pulverulent salts are screened before the mixing, to present a more homogeneous particle size.

According to an advantageous embodiment, the particle size is smaller than 100 microns.

According to this embodiment, the packing of the salt(s) is lower than 40%.

This final object of the invention is to provide a use of the process.

This object is attained by the fact that the reaction medium obtained according to the process is employed in chemical heat pumps.

Other characteristics and advantages of the present invention will appear more clearly on reading the description which follows, given with reference to the attached drawings, in which:

BRIEF DESCRIPTION OF THE DRAWINGS

FIG. 1 shows the curves of change in the energy density of two different salts, as a function of packing;

FIG. 2 shows the curves of change in the specific power of a reaction medium consisting of a mixture of salt and of expanded graphite, in various proportions, as a function of the packing of the mixture;

FIG. 3 shows the curve of power per kilogram of the reaction mixture as a function of the packing of the mixture, in the case of reaction media obtained according to the process of the invention;

FIG. 4 shows the curves of power per kilogram of the reaction medium as a function of the packing of the mixture in the case of packings which are lower than the maximum energy density packing.

In the art prior to the patent, shown in FIG. 2, the specific power passes through a maximum in the case of a percentage X of the optimum packing value, for a reaction medium corresponding to a mixture of 25% of expanded graphite by mass of the medium. Similarly, in the case of a reaction medium corresponding to a mixture of 35% of expanded graphite by mass of the medium, the curve of specific power of the mixture, as a function of the packing, passes through a maximum in the case of a percentage Y of the optimum packing value, the packing corresponding to the number of kilograms of the mixture per $m^3$.

It has been found, surprisingly, that by taking as a reaction mixture a mixture consisting of a pulverulent salt and of a porous product containing a certain proportion of expanded graphite and a second expanded product of rigid structure and high permeability, the specific power values of the reaction medium became independent of the packing in the case of packing values higher than the percentages X, Y corresponding to the maximum energy density for a mixture of graphite, expanded, and salt. Thus, curve 3 of FIG. 3 shows the specific power of a reaction medium as a function of the packing in the case of a reaction medium consisting of 25% of expanded graphite and of salt. Curve 4 shows the specific power of a reaction medium consisting of 35% of graphite mixed with a salt; curve 9 shows the specific power of the salt without addition of graphite. Lastly, curves 7 and 8 show the average specific power values in the case of a reaction ranging from zero to 70% of the total reaction of a reaction medium consisting of a mixture of 25% or 35% of porous product with salt, the porous product consisting of a mixture of expanded graphite and of a second expanded product of rigid structure and of high permeability. Surprisingly, it is found that, in the case of the packing values corresponding to the maximum energy densities for a mixture of graphite and salt in given proportions, the mixture according to the process for improving the reaction medium maintains a constant specific power independent of the packing, whereas in the case of values lower than the percentages X, Y, these specific power values follow the values of the mixture of graphite and salt.

Products obtained from exfoliated hydrated lamellar minerals will be advantageously employed as an expanded product. In particular, these products may be vermiculite, perlite or products obtained by exfoliation, and in particular from oxides of the $SiO_2$ and $Al_2O_3$ type (clays). The group of kandites (7 Å leaflet thickness) and of illites (10 Å leaflet thickness) is less advantageous than the smectites and the vermiculite group (leaflet thickness from 14.5 to 15 Å). Only vermiculites have the property of expanding in such a considerable way, a product of the zeolite type permitting (without exfoliation) a high permeability and a rigid structure. In the case of a percentage of 35 mass % of porous product, 25% of expanded graphite and 10% of the second product will be employed, whereas in the case of a percentage of 25% of the porous product, 20% of graphite and 5% of the second product will be employed. Since the specific power of the reaction medium is directly related to the characteristics of absorption and of desorption between a gas and the reaction medium, the advantage of this additive in the form of a porous product for the reaction medium is quite obviously understandable.

The high packing regions, that is to say a large quantity of reactive salt contained in a minimum volume, are of particular importance for the operation of heat pumps, where the storage function is sought after.

However, this reaction medium still exhibits the disadvantage, in the case of packing values which are lower than the packing percentages X, Y giving maximum specific power values, of exhibiting a specific power which can vary as a function of packing.

Equally surprisingly, it was found by experiment that by controlling the particle size of the salt mixed with the expanded graphite, it became possible to modify the specific power of the mixture in the case of low packings within a factor of 1 to 7. Thus, curve 3 in FIG. 4 shows the change in the specific power of a reaction medium based on a pulverulent salt containing 25% of graphite, whatever its particle size, and the curve 5 shows the change in the specific power of a reaction medium obtained from a mixture, in the same proportions, with a salt, screened beforehand to have a homogeneous particle size of less than 100 microns. In the case of curve 3, the salt has a particle size ranging from 20 microns to 1.5 mm. In the case of curve 5, it is found that in the case of a mixture obtained with a packing percentage P1, the specific power is several times greater than the specific power of the mixture with a variable particle size and represented by curve 3. Similarly, in the case of a reaction medium consisting of a mixture comprising 35% of porous product, a practically constant specific power curve is obtained up to a maximum corresponding to the packing percentage Y, and then a decrease in this power as a function of the increase in packing. In the case of a percentage of mixture of the order of 25%, curve 5 shows a power which increases up to a maximum, in the case of packing percentages lower than the value X. This power subsequently starts to decrease as a function of packing in the case of the values above X. The specific power per unit mass or the power per unit volume is increased by this process of mixing a product of given particle size. Now, it is the highest values of power per unit mass or volume that are sought after in the case of industrial heat pumps.

In actual fact, depending on the practical applications aimed at, a technoeconomic compromise will be sought between the cost of the reactants for the available volume in relation to the desired power and the exchange surface area.

Thus, by a process making use of a reaction medium employing an additional porous product, in addition to the expanded graphite, and by calibrating the particle size of the salt employed in the mixture, it becomes possible to obtain a reaction medium whose specific power remains practically independent of the packing of the mixture.

Other modifications within reach of the person skilled in the art also form part of the concept of the invention.

We claim:

1. In an improved packed reaction medium for use in a gas-solid reaction heat pump; said reaction medium comprising an absorptive reactive salt in pulverulent form and a porous product mixed with said salt; said porous product being expanded graphite; and said porous product being present in a positive amount up to and including 60 mass percent of the reaction medium; said salt being a metal halide capable of swelling when reacted in said gas-solid reaction heat pump; wherein the improvement comprises: an improved porous product in the reaction medium; said porous product comprising expanded graphite in combination with a second expanded product of rigid structure and high permeability which is obtained from an exfoliated hydrated lamellar mineral; said second expanded product being present in an effective amount so that absorption or desorption of a gas by the reaction medium is substantially independent of the packing of the reaction medium.

2. The reaction medium of claim 1 wherein the second expanded product is vermiculite.

3. The reaction medium of claim 1 wherein the second expanded product is perlite.

4. The reaction medium of claim 1 wherein the percentage of porous product equals 25% of the reaction medium.

5. The reaction medium of claim 4 wherein the salt has a packing value which is higher than 60% of the optimum packing value of the salt.

6. The reaction medium of claim 1 wherein the reaction medium contains 25 mass percent of expanded graphite and 10 mass percent of the second expanded product so that the mass percentage of the total amount of porous product equals 35% of the reaction medium.

7. The reaction medium of claim 1 wherein the packing value of the salt is higher than 50% of the optimum packing value of the salt.

8. The reaction medium of claim 1 wherein the pulverulent salts are screened before mixing to produce a more homogenous particle size.

9. The reaction medium of claim 8 wherein the screened pulverulent salts have a particle size smaller than 100 microns.

10. The reaction medium of claim 1 wherein the screened pulverulent salts have a packing value of less than 40% of the optimum packing value of the salts.

11. The reaction medium of claim 1 wherein the second expanded product is smectite.

12. The reaction medium of claim 1 wherein the second expanded product is zeolite.

13. The reaction medium of claim 1 wherein the second expanded product is kandite.

14. The reaction medium of claim 1 wherein the second expanded product is illite.

15. The reaction medium of claim 1 wherein said metal halide is an alkaline earth metal halide.

* * * * *